(12) United States Patent
Sanghvi et al.

(10) Patent No.: US 11,743,142 B1
(45) Date of Patent: Aug. 29, 2023

(54) SEGMENTATION USING INFRASTRUCTURE POLICY FEEDBACK

(71) Applicant: Illumio, Inc., Sunnyvale, CA (US)

(72) Inventors: Rushabh Sanghvi, Milpitas, CA (US); George Jeffrey Francis, Franktown, CO (US); Rupesh Kumar Mishra, Santa Clara, CA (US)

(73) Assignee: Illumio, Inc., Sunnyvale, CA (US)

( * ) Notice: Subject to any disclaimer, the term of this patent is extended or adjusted under 35 U.S.C. 154(b) by 0 days.

(21) Appl. No.: 17/556,803

(22) Filed: Dec. 20, 2021

(51) Int. Cl.
| G06F 15/173 | (2006.01) |
| H04L 41/5019 | (2022.01) |
| H04L 47/20 | (2022.01) |
| H04L 41/5041 | (2022.01) |
| H04L 67/53 | (2022.01) |
| G06F 15/16 | (2006.01) |

(52) U.S. Cl.
CPC ...... H04L 41/5019 (2013.01); H04L 41/5041 (2013.01); H04L 47/20 (2013.01); H04L 67/53 (2022.05)

(58) Field of Classification Search
CPC . H04L 41/5019; H04L 41/5041; H04L 47/20; H04L 67/53
USPC .................................................... 709/223
See application file for complete search history.

(56) References Cited

U.S. PATENT DOCUMENTS

| 10,826,803 | B2 * | 11/2020 | Gandham | H04L 41/145 |
| 2016/0373944 | A1 * | 12/2016 | Jain | H04L 65/80 |
| 2018/0309632 | A1 * | 10/2018 | Kompella | H04L 41/0866 |
| 2018/0351804 | A1 * | 12/2018 | Mohanram | H04L 41/142 |
| 2018/0351818 | A1 * | 12/2018 | Mohanram | H04L 41/145 |
| 2018/0351820 | A1 * | 12/2018 | Nagarajan | H04L 41/5003 |
| 2018/0367371 | A1 * | 12/2018 | Nagarajan | H04L 41/12 |
| 2018/0367401 | A1 * | 12/2018 | Harneja | H04L 41/122 |
| 2018/0367412 | A1 * | 12/2018 | Sethi | H04L 41/12 |
| 2019/0028342 | A1 * | 1/2019 | Kommula | H04L 45/24 |
| 2020/0374229 | A1 * | 11/2020 | Vysotsky | H04L 41/0843 |
| 2021/0335505 | A1 * | 10/2021 | Tedaldi | G06K 9/6282 |
| 2022/0147876 | A1 * | 5/2022 | Dalli | G06N 3/08 |
| 2022/0239674 | A1 * | 7/2022 | Mouleeswaran | H04L 63/20 |

* cited by examiner

*Primary Examiner* — Karen C Tang
(74) *Attorney, Agent, or Firm* — Fenwick & West LLP

(57) ABSTRACT

A computing device (e.g., a policy management server) obtains a segmentation policy that includes a set of rules for controlling network traffic between workloads. The computing device also receives infrastructure feedback regarding configuration of third-party network infrastructure. The computing device uses the infrastructure feedback to identify a discrepancy between the segmentation policy and the configuration of the third-party network infrastructure and triggers a corrective action in response. The corrective action may include providing a notification or suggestive remedy for the discrepancy to the user or automatically remedying the discrepancy.

20 Claims, 5 Drawing Sheets

SEGMENTATION USING INFRASTRUCTURE POLICY FEEDBACK

BACKGROUND

Technical Field

This application relates generally to managing of a segmentation policy, and, in particular, to identifying and accounting for differences between a managed segmentation policy and a policy implemented by the underlying network infrastructure.

Description of Related Art

A segmentation policy comprises a set of rules that control which workloads may communicate on a network and may place restrictions on how such workloads may communicate. In one implementation, distributed enforcement modules executing on hosts receive management instructions for configuring local firewalls to enforce the rules with respect to local workloads. However, network traffic between workloads managed by the segmentation policy is often communicated via network infrastructure that is not directly controlled by the segmentation policy. Thus, network traffic that is allowed by the segmentation policy may nevertheless be blocked by the network infrastructure (e.g., by a cloud firewall rule).

Such difference between the network traffic allowed by the segmentation policy and the underlying network infrastructure presents various problems. These inconsistencies increase the complexity for users in configuring the network because traffic they expect to be allowed (e.g., traffic explicitly allowed by the segmentation policy) may in fact be blocked (e.g., by a cloud firewall). This also presents potential security concerns because changes to the network infrastructure configuration can lead to network traffic that a user intends to not allow becoming allowed. For example, consider the case where a user intends to block a particular type of undesirable network traffic but erroneously configures the segmentation policy to allow it. If the network infrastructure initially blocks the undesirable network traffic during testing, the user may incorrectly believe that the segmentation policy is configured correctly. If the configuration of the network infrastructure is later changed, the undesirable network traffic suddenly becomes allowed in contradiction with the user's intent.

SUMMARY

A method, computer-readable medium, and system provide for identifying and accounting for differences between a managed segmentation policy and a policy implemented by the underlying network infrastructure. In various embodiments, a computing device (e.g., a policy management server) obtains a segmentation policy that includes a set of rules for controlling network traffic between workloads. The computing device also receives infrastructure feedback regarding configuration of third-party network infrastructure. The computing device uses the infrastructure feedback to identify a discrepancy between the segmentation policy and the configuration of the third-party network infrastructure and triggers a corrective action in response.

The infrastructure feedback may include one or more of: a policy implemented by one or more network infrastructure devices, data regarding network flows provided by one or more network infrastructure devices, or data regarding network flows gathered by one or more hosts using passive or active probing of the network infrastructure. The corrective action may include one or more of presenting a user (e.g., an administrator of the segmentation policy) with a notification of the discrepancy, presenting the user with a suggested remedy for the discrepancy, presenting the user with controls for modifying the segmentation policy, sending a request or instruction to modify the configuration of the network infrastructure, or providing the user with controls for generating a request or instruction to modify the configuration of the network infrastructure.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example Systems

Figure 1:
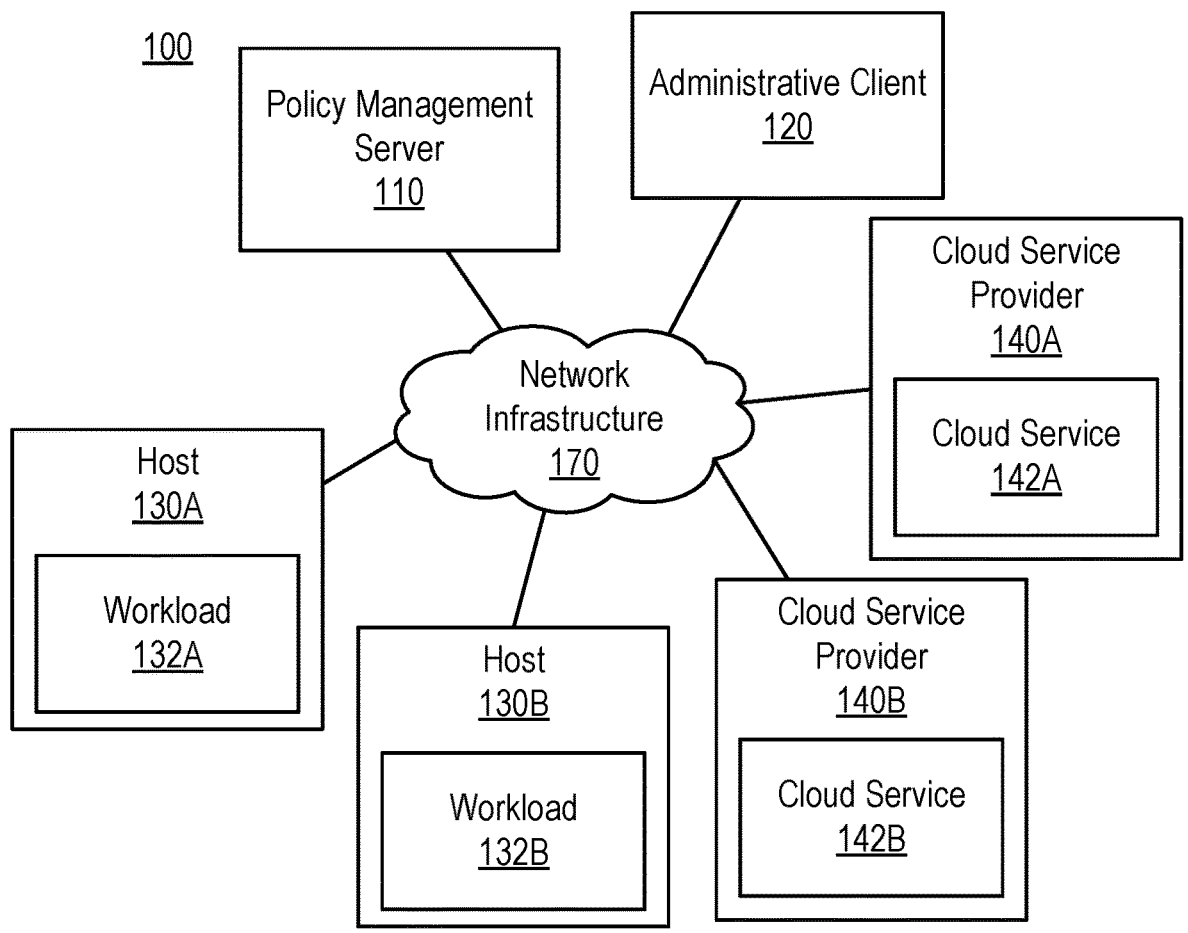
FIG. 1 is a block diagram of a networked computing environment with a managed segmentation policy, according to one embodiment.

FIG. 1 illustrates one embodiment of a networked computing environment 100. In the embodiment shown, the networked computing environment 100 includes a policy management server 110, an administrative client 120, one or more hosts 130, and one or more cloud service providers 140. Each host 120 hosts one or more workloads 132. Each cloud service provider 140 provides one or more cloud services 142. A cloud service 142 may be considered a type of workload 132. Various components of the networked computing environment 100 communicate via a network provided by network infrastructure 170. In other embodiments, the networked computing environment 100 includes different or additional elements. In addition, the functionality may be distributed among the elements in a different manner than described.

The policy management server 110 is an application executing on a host 130 or computer (or set of computers) that obtains and stores information about the hosts 130 and cloud service providers 140 as well as the workloads 132 and cloud services 142 executing on the hosts 130 and cloud service providers 140, respectively. The policy management server 110 manages a segmentation policy that regulates communications to and from the workloads 132 (and, in some cases, the services cloud 142).

In one embodiment, the segmentation policy is defined using permissive rules that specify connections that are permitted. The segmentation policy is enforced by blocking connections that are not expressly permitted by the rules. In other words, the segmentation policy may be an allow-only policy. The segmentation policy may include a set of rules specifying whether certain workloads 132 are allowed to provide services to or receive services from other workloads 132 (or cloud services 142), and may place restrictions on how those workloads 132 are allowed to communicate when providing or consuming the services.

For example, a segmentation policy may include a rule specifying that a first workload 132A on a first host 130A is allowed to provide a particular service to a second workload 132B on a second host 130B, but the segmentation policy does not include any rule allowing the first workload 132A to provide the service to a third workload or consume cloud services 142A and 142B from cloud service providers 140A and 140B, respectively. Thus, given the absence of such a permissive rule, the first workload 132A is blocked from providing the service to the third workload or consuming services from the cloud service provider 140. The rule may furthermore specify the type of service that the first workload 132A is allowed to provide to the second workload 132B (e.g., a database service, a web service, etc.), what ports may be used in providing the service, and how the first and second workloads 132 may communicate when providing this service (e.g., using certain specified protocols, using encrypted communication only, using authenticated communication only, etc.). A rule may be specified as a plurality of fields including a "service," a "provided-by" portion that identifies one or more workloads 132 that is permitted to provide the service (which may be specified by a port number), a "used-by" portion that identifies one or more workloads 132 that is permitted to use the service provided by the workloads 132 in the "provided-by portion," and a "rule function" that may place one or more restrictions on the communications between the workloads 132 while facilitating the service.

In various embodiments, the policy management server 110 identifies discrepancies between the segmentation policy and the configuration of the underlying network infrastructure 170. A discrepancy in this context is a particular flow that is allowed by the segmentation policy but blocked by the network infrastructure 170 or vice versa. The policy management server 110 may also take one or more corrective actions in response to identifying a discrepancy, such as notifying an administrator, proposing a change to the segmentation policy or the configuration of the network infrastructure 170, or automatically making a change to the segmentation policy or the configuration of the network infrastructure 170. Various approaches to identifying discrepancies and taking corrective action are described in greater detail below, with reference to FIG. 2.

The administrative client 120 comprises a computing device that may be operated by an administrator managing the policy management server 110. The administrative client 120 may execute an interface (e.g., via an application or web browser) that enables the administrator to interact with the policy management server 110 to configure or view the segmentation policy. The interface may furthermore enable the administrator to obtain various information about the hosts 130, workloads 132, cloud service providers 140, and cloud services 142 on the network 110 and view traffic flows between the workloads 132. The administrative client 120 may also present identified discrepancies and proposed configuration changes.

A host 130 may be a physical host device, a virtual machine executing on a computer system, or an operating system instance executing on a physical host device or virtual machine capable of hosting one or more workloads 132. FIG. 1 shows two hosts 130 but the networked computing environment 100 may include any number of hosts 130. A single physical or virtual machine may operate a single host 130 or may operate multiple hosts 130.

The workloads 132 are independently addressable computing units for performing computing tasks. For example, each workload 132 may be addressable by a specific network address associated with the host 130 and a port associated with a service provided by the workload 132. Example workloads 132 includes an application or application component, a process, a container, or other sub-component thereof executing on the host 130. In some instances, a host 130 may operate only a single workload 132. In other instances, a host 130 may operate multiple workloads 132 (e.g., multiple containers) that may be independently addressable and may execute different applications or otherwise perform different independent computing functions. In some embodiments, multiple workloads 132 may operate collectively to execute an application. The workloads 132 on the hosts 130 may communicate with other workloads 132 on different hosts 130, cloud services 142 provided by cloud service providers 142, or both, to perform various tasks. Various embodiment of host 130 and workload 132 are described in greater detail below, with reference to FIGS. 3 and 4.

A cloud service provider 140 is a computing device (e.g., a server) that hosts one or more cloud services 142. FIG. 1 shows two cloud service providers 140 but the networked computing environment 100 may include any number of cloud service providers 140. The cloud services 142 provided by cloud service providers 140 are distinct from the workloads 132 in that they are not directly managed by the segmentation policy. Whether a given workload 132 can consume or provide services form a cloud service provider 140 can be controlled by the segmentation policy rules applied to traffic to and from the given workload 132. Additionally or alternatively, traffic to and from a cloud service provider 140 may be routed through a dedicated workload 132 that controls access to the corresponding cloud service 142. Thus, cloud service providers 140 may appear to the hosts 130 as additional hosts and the cloud services 142 they provide may be treated as additional workloads 132.

The network infrastructure 170 provides communication pathways between at least some of: the policy management server 110, the administrative client 120, the hosts 130, and the cloud service providers 140. The network infrastructure 170 may use standard communications technologies and protocols, such as the internet. Additionally or alternatively, the entities in the networked computing environment 100 may use custom or dedicated data communications technologies. One or more components of the network infrastructure 170 (e.g., a cloud firewall) may apply network traffic policies in addition to the segmentation policy managed by the policy management server 110.

In one embodiment, at least some of the network infrastructure 170 is third-party network infrastructure that applies a policy that is distinct from the segmentation policy. The term third-party network infrastructure is used for convenience herein to describe portions of the network infrastructure 170 that are not directly controlled by the policy management server 110. It should not be construed to require that the third-party infrastructure is owned or operated by a separate entity (e.g., an enterprise may operate a policy management server 110 that enforces a segmentation policy as well as a firewall that manages traffic entering and leaving the enterprise network). As described previously, differences between the segmentation policy and one or more policies implemented by third-party network infrastructure can cause various problems. For example, enterprise users may expect service requests to a cloud service provider 140 that is allowed by the segmentation policy to be completed successfully and be confused or frustrated if those requests are blocked by third-party network infrastructure. As another example, changes to the configuration of the third-party network infrastructure can result in traffic that users expect to be blocked suddenly becoming allowed, which may represent a security threat to the enterprise.

Figure 2:
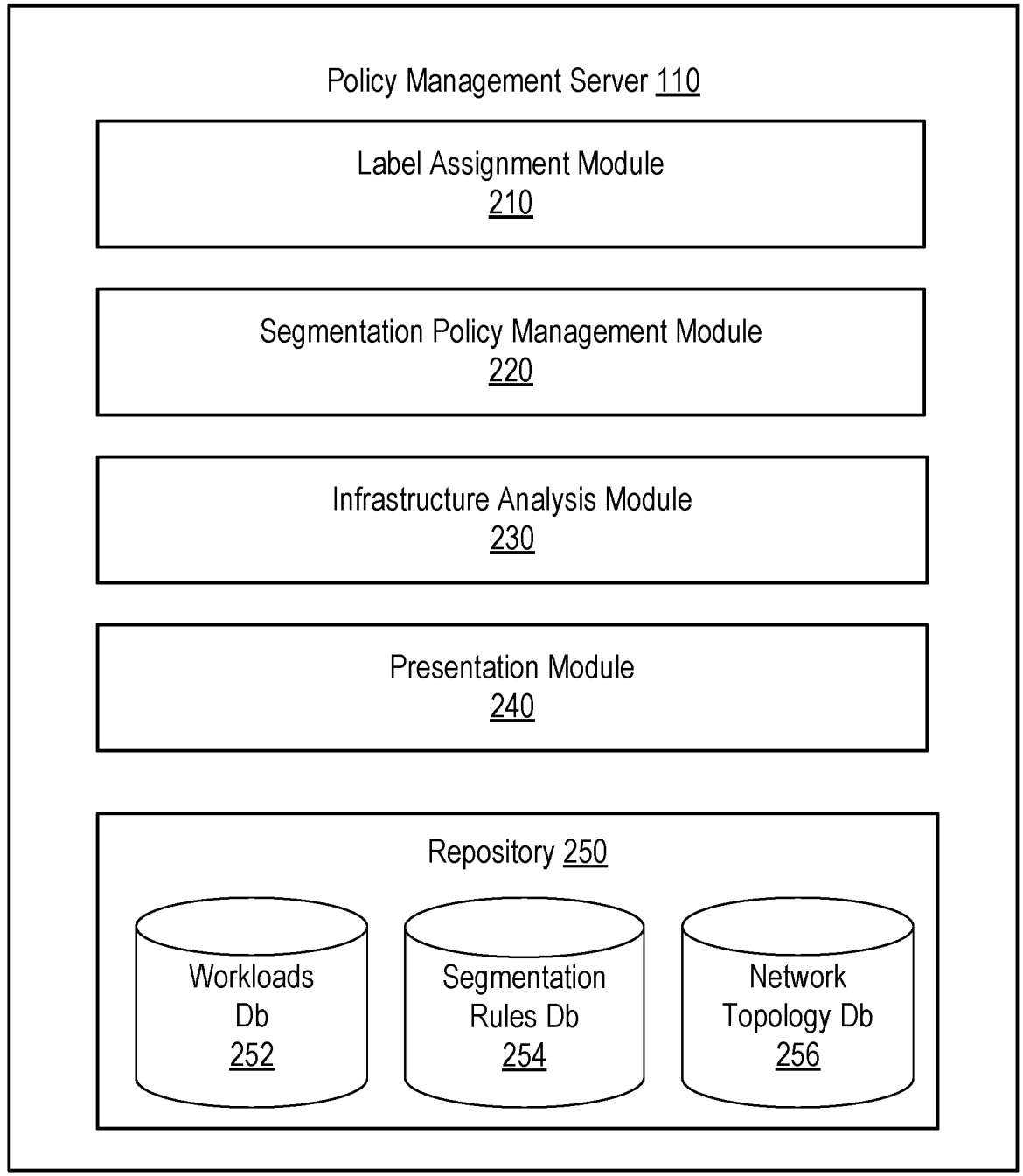
FIG. 2 is a block diagram of the policy management server of FIG. 1, according to one embodiment.

FIG. 2 illustrates one embodiment of the policy management server 110. In the embodiment shown, the policy management server 110 includes a label assignment module 210, a segmentation policy management module 220, an infrastructure analysis module 230, a presentation module 240, and a repository 250. The various components of the policy management server 110 may be implemented as one or more processors and a non-transitory computer-readable storage medium that stores instructions executed by the one or more processors to carry out the functions attributed to the policy management server 110 described herein. In other embodiments, the policy management server 110 may include different or additional components. In addition, the functionality may be distributed among the elements in a different manner than described.

The label assignment module 210 facilitates assignment of labels to workloads 132. For example, the label assignment module 210 may assign labels based on a set of configurable label assignment rules that may be managed by an administrator via the administrative client 120. Alternatively, labels for individual workload 132 may be manually assigned by an administrator. Labels may be updated dynamically based on changing characteristics of workloads 132.

In one embodiment, the label assignment module 210 may assign one or more labels to each workload 132 that define one or more high-level characteristics of the workload 132. Labels may be multi-dimensional. Here, a label may comprise a "dimension" (a high-level characteristic) and a "value" (the value of that high-level characteristic). For example, one possible label dimension may specify a "role" of the workload 132 and may have values such as "web," "API," or "database" specifying the role of the workload 132. In another example, a label dimension may specify a "location" of the workload 132 and may have values such as "United States" or "Europe." Workloads 132 may also be labeled based on a user group of a user that is logged into the workload 132 or the corresponding host 130 on which the workload 132 executes. For example, a workload 132 may have a label with a dimension "user group" and a value "managers." Each workload 132 may be assigned labels for one or more dimensions but each workload 132 does not necessarily have a label assigned for every possible dimension. For example, a workload 132 may have a label specifying its location but may not necessarily have a label specifying its role. The set of labels assigned to a particular workload 132 may be referred to herein as a label set for the workload 132.

A logical management model specifying the number and types of dimensions available and those dimensions' possible values may be configurable. In one embodiment, the logical management model includes the following dimensions and possible values, as shown in

TABLE 1

Example of logical management model

| Dimension | Meaning (M), Values (V) |
|---|---|
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation policy management module 220 manages configuring and updating of a segmentation policy that includes a set of segmentation rules. The segmentation rules may be manually configured by a system administrator or may be generated automatically based on various predefined segmentation strategies. Once configured, the segmentation policy management module 220 distributes the rules to hosts 130 to enforce the segmentation policy. For example, the segmentation policy management module 220 may determine which segmentation rules are relevant to different hosts 130 depending on the labels of the workloads 132 associated with each host 130 and distributes only relevant rules to each one. Thus, different hosts 130 may receive different subsets of the rules depending on which workloads 132 are associated with them. The segmentation policy management module 220 may dynamically update instructions sent to the hosts 130 in response to changes in the segmentation policy, changes to the labels of workloads 132, changes to the applications executing on the workloads 132, or changes to application information associated with the applications.

In one embodiment, the segmentation policy management module 220 uses label sets to enable the segmentation policy to be defined at a high level of abstraction by specifying rules based on label sets. Thus, a rule of the segmentation policy may identify a group of workloads 132 to which a portion of the rule is applicable by referencing one or more label sets. For example, a rule may specify that a first group of workloads 132 with a label set A may provide a service B to a second group of workloads 132 with a label set C. Rules may be specified for groups of workloads 132 identified using only a subset of the label dimensions.

The segmentation policy management module 220 may maintain a repository storing information about the hosts 130 and the workloads 132 managed by the segmentation policy. For example, the policy management server 110 may store workload identifiers that identify the workloads 132 and membership information indicating one or more groups of workloads 132 to which each workload 132 belong (e.g., as defined by the respective label sets for the workloads 132).

Table 2 illustrates an example of information stored by the segmentation policy management module 220. The workload IDs represent the workload identifiers for the workloads 132. The memberships represent groups to which one or more workloads 132 belong. Each group may correspond to a unique label set involving one or more dimensions.

TABLE 2

Example of a Repository Table

| Workload ID | Memberships |
|---|---|
| ID1 | A, C, D |
| ID2 | B, C |
| . | D |
| . | . |
| . | . |
| IDn | B, D, E, F |

The infrastructure analysis module 230 analyzes infrastructure feedback to identify or infer network flows that are allowed and blocked by the network infrastructure 170 for reasons other than enforcement of the segmentation policy. For example, the identified or inferred network flows may be a set of allow and block rules of a cloud firewall policy being enforced by third-party network infrastructure. The infrastructure feedback may be gathered by the policy management server 110, gathered by one or more hosts 130, provided by one or more cloud service providers 140, provided by the network infrastructure 110 itself, or any combination thereof. The infrastructure analysis module 230 may identify discrepancies between the segmentation policy and the network flows that are allowed and blocked by the network infrastructure 170.

In one embodiment, the infrastructure analysis module 230 receives a policy being enforced from the network infrastructure 170 itself. For example, a cloud firewall may make a policy it is enforcing on network traffic available to the infrastructure analysis module 230. The policy may be an allow/deny ruleset including allow rules indicating network flows that are allowed and deny rules indicating network flows that are blocked. If the policy management server 110 is using an allow-only segmentation policy, the infrastructure analysis module 230 may convert the allow/deny ruleset into an allow-only policy for easier comparison with the segmentation policy. One possible approach to converting an allow/deny ruleset into an allow-only policy is described below, with reference to FIG. 6.

In another embodiment, the infrastructure analysis module 230 receives flow data from hosts 130 that it analyzes to passively identify network flow policies being applied by the network infrastructure 170. The flow data includes flow parameters that include source and destination information for network traffic, such as the source IP, destination IP, destination port, protocol, and timestamp of flow originating from or received by a host 130. The infrastructure analysis module 230 may correlate flows originating from one host 130 with flows received by another host 130 by comparing the corresponding flow parameters. While flow data (or individual packets) may occasionally be lost, over a period of time, blocked flows are distinguishable from flows lost due to network errors by the consistency with which flows are originated but not received. For example, if less than a threshold percentage of originated flows with a given set of flow parameters can be paired with corresponding received flows, the infrastructure analysis module 230 may determine that the network infrastructure 170 is blocking that flow. Conversely, if more than the threshold percentage of originated flows with a given set of flow parameters can be paired with corresponding received flows, the infrastructure analysis module 230 may determine that the network infrastructure 170 is allowing that flow. The allowed and denied flows identified using this passive probing technique may be compared to the segmentation policy to identify discrepancies. Additionally or alternatively, if third-party network infrastructure (e.g., a cloud firewall) makes flow logs indicating flows that were allowed and blocked available to the infrastructure analysis module 230, the configuration of the network infrastructure 110 may be determine by analyzing the flow logs.

In addition to or instead of the passive probing technique described above, the infrastructure analysis module 230 may use an active probing technique to learn information about the flows allowed and denied by the network infrastructure 170. In one embodiment, hosts 130 may periodically send packets to a range of destination IPs and ports to test whether those packets are received. The hosts 130 may incrementally test each IP and port of interest in order or the IP and port space may be pseudo-randomly sampled. In this way, it is possible to map the entire port range of TCP and/or UDP over a period of time with only a small impact on network overhead. Alternatively, more complex sampling schemes may be used, such as a weighted pseudo-random approach that is more likely to test IP and port ranges that are expected to be used frequently than those that are expected to be used only rarely, if at all.

Regardless of the source or sources of infrastructure feedback obtained, the infrastructure analysis module 230 may compare flows being allowed or denied by the network infrastructure 170 to the segmentation policy to identify discrepancies. The presentation module 240 interfaces with the administrative client 120 to present a user interface enabling an administrator to view a representation of the traffic flows and any identified discrepancies (e.g., there not being any observed traffic along a route that the segmentation policy indicates is allowed). To give a specific example of a user interface, the presentation module 240 may generate a graphical interface representing all or a portion of the traffic flow graph with the workloads 132 illustrated as nodes and the traffic flows to and from the workload 132 illustrated as edges connecting relevant nodes. An administrator may similarly select an edge on the graph to view information about the corresponding traffic flow such as, for example, services associated with the traffic flow, ports and protocols associated with the traffic flow, statistical information associated with the traffic flow, or discrepancies between the segmentation policy and the configuration of the network infrastructure 170 that were identified by the infrastructure analysis module 230.

The user interface may also enable the administrator to view, create, or modify rules associated with the segmentation policy. Thus, the administrator may modify the segmentation policy to address an identified discrepancy between the segmentation policy and the configuration of the network infrastructure 170. Additionally or alternatively, in configurations where the policy management server 110 has authorization to make changes to the configuration of the network infrastructure 170, the policy management server 110 may address identified discrepancies by automatically or semi-automatically (e.g., in response to approval by the administrator of a recommendation presented in the user interface) modifying the configuration of the network infrastructure 170 to be more consistent with the segmentation policy.

The repository 250 includes one or more computer-readable media that store data or software used by the policy management server 110. The repository may include a workloads database 252 that stores associations between workloads 132 and their respective label sets, a segmentation rules database 254 that stores a segmentation policy as a set of rules, and a network topology database 256 that stores a topology of the network 110. Although these databases are shown as distinct entities, the y may be combined or the data attributed to each may be distributed across two or more databases in other ways. Furthermore, although the repository 250 is shown as part of the policy management server 110, some or all of the data may be stored at other locations (e.g., in a distributed database provided by a cloud service provider 140) and accessed via the network infrastructure 110.

Figure 3:
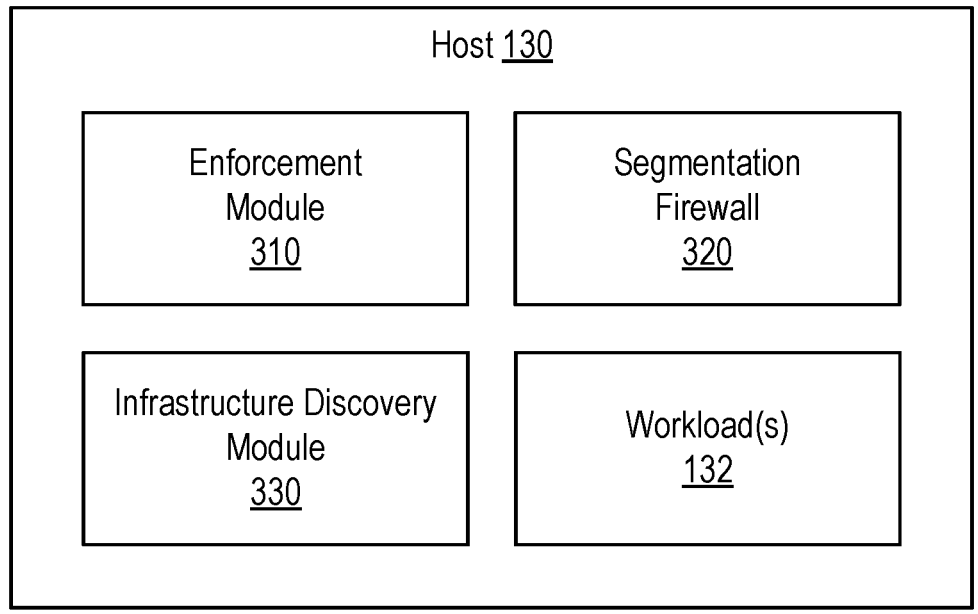
FIG. 3 is a block diagram of one of the hosts of FIG. 1, according to one embodiment.

FIG. 3 illustrates one embodiment of a host 130. In the embodiment shown, the host 130 includes an enforcement module 310, a segmentation firewall 320, an infrastructure discovery module 330, and one or more workloads 132. In other embodiments, the host 130 includes different or additional elements. In addition, the functionality may be distributed among the elements in a different manner than described. For example, the host 130 may not include a segmentation firewall 320.

Instead of enforcing the segmentation policy at a centralized device, the segmentation policy may be enforced in a distributed manner. For example, at least some of the hosts 130 may include an enforcement module 310. To enable enforcement of the segmentation policy, the policy management server 110 generates a set of management instructions and distributes the management instructions to the enforcement modules 310. The management instructions include the rules controlling communications between different groups of workloads 132 (e.g., specified by their label sets or directly by an identifier of the workload 132) and membership information indicating workloads 132 belonging to each group (e.g., which workloads 132 have certain label sets). For efficiency of distribution, the policy management server 110 may send different management instructions to different enforcement modules 310 so that each enforcement module 310 gets only the management instructions relevant to its operation. Here, the policy management server 110 may determine which rules are relevant to a given enforcement module 310 and distribute the relevant rules to that enforcement module 310. A rule may be deemed relevant to an enforcement module 310 on a particular host 130 if that host 130 executes one or more workloads 132 that belongs to a group (defined by one or more label sets) referenced by the rule and the enforcement module 310 on the host 130 is configured to enforce that particular rule. The policy management server 110 may furthermore determine which membership information is relevant to each enforcement module 310 and distribute the relevant membership information to each respective enforcement module 310. Here, membership information may be relevant to a particular enforcement module 310 if it defines membership of a group referenced by a rule deemed relevant to the particular enforcement module 310.

The enforcement module 310 receives management instructions including the relevant rules from the policy management server 110. In one embodiment, the enforcement module 310 translates the management instructions from a high level of abstraction to a low level of abstraction.

The enforcement module 310 may directly apply the rules and/or may configured the segmentation firewall 320 to enforce some or all of the rules. For example, for a given rule that permits communication between a workload 132 executing on the host 130 and a group of other workloads 132 having a label set A, the enforcement module 310 may determine workload identifiers for each of the workloads 132 having the label set A, and configure rules of the segmentation firewall 320 to permit communications with the identified workloads 132 in accordance with any restrictions (e.g., ports and protocols) specified in the given rule. The combination of the enforcement module 310 and the segmentation firewall 320 may operate to execute the firewall rules to enforce the segmentation policy with respect to a workload 132 executing on the host 130.

Figure 4:
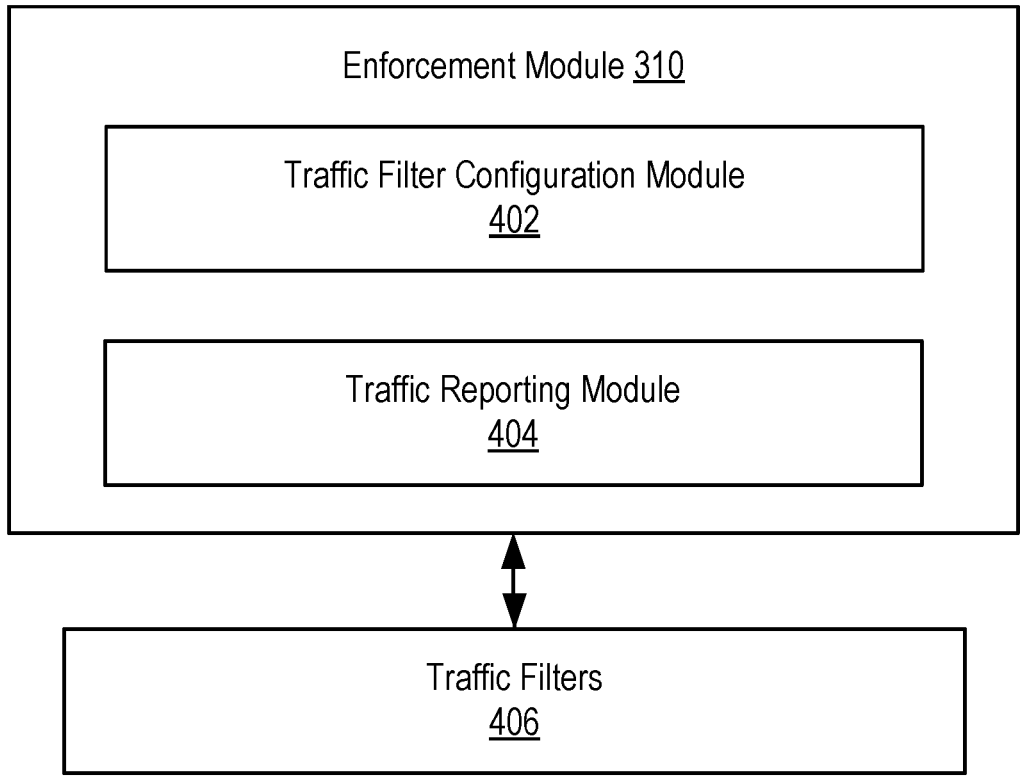
FIG. 4 is a block diagram illustrating the operation of the enforcement module of FIG. 3, according to one embodiment.

FIG. 4 illustrates one embodiment of the enforcement module 310. In the embodiment shown, the enforcement module 310 includes a traffic filter module 402 and a traffic reporting module 404 that may each interact with one or more traffic filters 406. The traffic filters 406 operates to enforce the segmentation policy with respect to a workload 132 executing on a host 130. To enforce the segmentation policy, the traffic filters 406 may apply a set of packet filtering rules that block or allow communications to a particular workload based on specific criteria associated with the communications such as the source and destination network addresses and ports, protocols associated with the communication, and a connection state. As described previously, the segmentation rules applied by the traffic filters 406 may generally be permissive rules that specify which specific communications are permitted. A default rule may cause the traffic filters 406 to block communications (e.g., drop packets) that do not match any of the permissive rules. In one embodiment, the traffic filters 406 include an operating system-level firewall such as a Linux kernel firewall based on iptables or Netfilter modules or a Windows firewall based on a Windows Filtering Platform. The traffic filters 406 may also include an Internet Protocol security (IPsec) engine that controls encryption and decryption of packets.

The traffic filter configuration module 402 receives management instructions from the policy management server 110 and configures the traffic filters 406 accordingly. For example, for a given rule that permits communication between a workload 132 managed by the enforcement module 310 and a group of other workloads 132 having a specified label set, the traffic filter configuration module 402 determines workload identifiers for each of the workloads 132 having the specified label set, and configures the traffic filters 406 to permit communications with the identified workloads 132 in accordance with any restrictions (e.g., ports and protocols) specified in the given rule.

The traffic reporting module 404 obtains traffic flow data from the traffic filters 406 indicating communications that pass through the filters 406 and communications that are blocked by the filters 406. For example, the traffic flow data may indicate the source network address and port, the destination network address and port, the protocol associated with the communication, whether the communication as allowed or blocked (and according to what rule), a connection state, or other identifying information. The traffic reporting module 404 may then report the traffic flow data to the policy management server 110 for use in identifying discrepancies between the segmentation policy and the configuration of the network infrastructure 170. In one embodiment, the traffic reporting module 404 may aggregate or filter the traffic flow data prior to reporting to the policy management server 110. Alternatively, the traffic reporting module 404 may report the raw traffic flow data to the policy management server 110.

Referring back to FIG. 3, the segmentation firewall 320 (if included) may be configured to operate in a plurality of different modes including a co-existence mode in which the segmentation firewall 320 and another firewall (e.g., a system firewall) both operate to enforce their respective firewall rules, an exclusive mode in which the segmentation firewall 320 enforces the segmentation policy and the other firewall is effectively bypassed, and a monitoring mode in which the system firewall enforces its security policy and enforcement of the segmentation policy is effectively bypassed. In each of these modes (including the monitoring mode), the segmentation firewall 320 may log the applicability of its firewall rules to a given communication and provide the logs to the policy management server 110.

The infrastructure discovery module 330 may probe the network infrastructure 170 using the techniques described previously for passive probing, active probing, or both. The infrastructure discovery module 330 may send the raw data it gathers on the network infrastructure 170 to the policy management server or it may perform some preprocessing or filtering (e.g., to reduce the size of the data transmitted to the policy management server 170).

Example Methods

Figure 5:
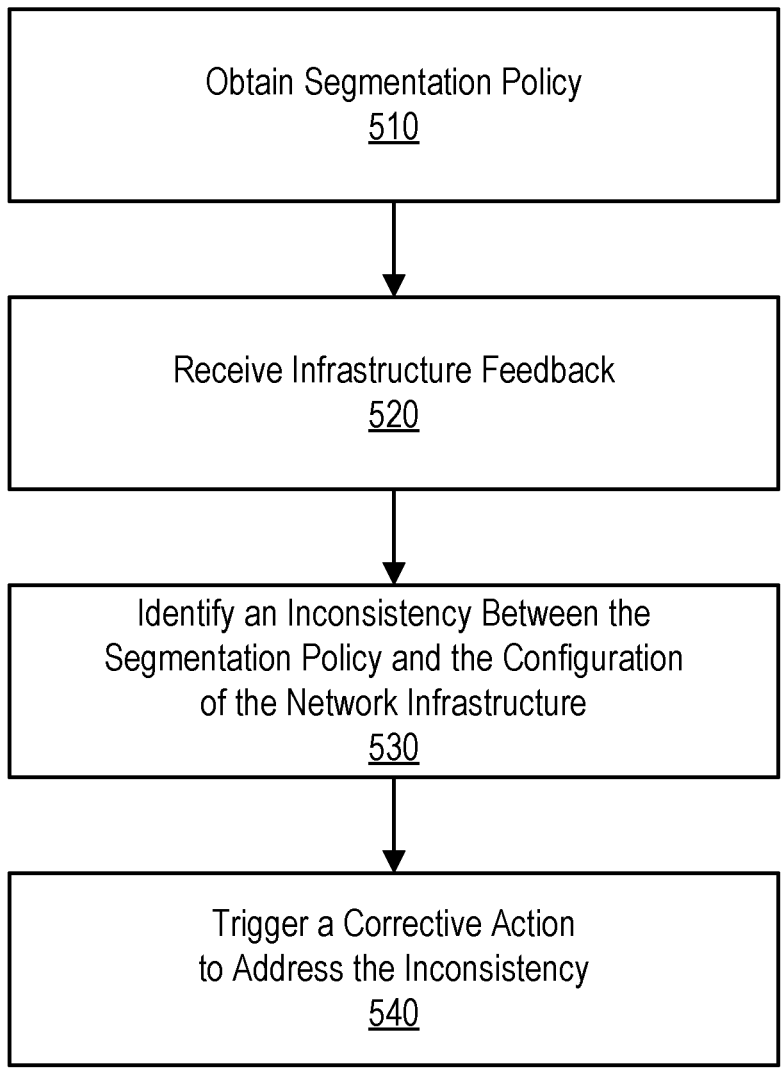
FIG. 5 is a flowchart illustrating a method for addressing a discrepancy between a segmentation policy and the configuration of network infrastructure, according to one embodiment.

FIG. 5 illustrates a method for addressing a discrepancy between a segmentation policy and the configuration of network infrastructure, according to one embodiment. The steps of FIG. 5 are illustrated from the perspective of the policy management server 110 performing the method. However, some or all of the steps may be performed by other entities or components. In addition, some embodiments may perform the steps in parallel, perform the steps in different orders, or perform different steps.

In the embodiment shown in FIG. 5, the method begins with the policy management server 110 obtaining 510 a segmentation policy. The segmentation policy may be a pre-defined policy retrieved from a data store, defined by administrator (e.g., using a user interface of the administrative client 120), or automatically defined based on a selected segmentation strategy.

The policy management server 110 receives 520 infrastructure feedback. As described previously, the infrastructure feedback may include one or more of: a policy implemented by one or more network infrastructure devices (e.g., a third-party cloud firewall or other third-party network infrastructure device), data regarding network flows provided by one or more network infrastructure devices, data regarding network flows gathered by one or more hosts 130 using passive probing, or data regarding network flows gathered by one or more hosts 130 using active probing.

The policy management server 110 identifies 530 one or more discrepancies between the segmentation policy and the configuration of the network infrastructure 170. In one embodiment, the policy management server 110 infers or otherwise determines a policy being applied by one or more network infrastructure devices from the infrastructure feedback. The determined policy may then be compared to the segmentation policy to determine if there are any discrepancies.

The policy management server 110 may trigger 540 a corrective action in response to identifying 530 a discrepancy. In one embodiment, the corrective action includes generating a notification for display to an administrator (e.g., in a user interface provided by the administrative client 120, or by sending an email or instant message to the administrator) that identifies the discrepancy. The notification may be presented to the administrator in conjunction with a recommended change to the segmentation policy to remedy the discrepancy. The administrator may also be presented one or more controls for implementing the recommended change (e.g. a button labelled "approve and implement this change"). In another embodiment, the corrective action includes automatically updating the segmentation policy to remove the discrepancy (e.g., by matching the segmentation policy to the inferred configuration of the network infrastructure 170). Removing he discrepancy may include reducing the scope of one or more permissive rules of the segmentation policy in the least restrictive way needed to exclude the traffic found to be blocked by the network infrastructure. Additionally or alternatively, the policy management server 110 may automatically (or in response to administrator approval) send a request or instructions to one or more network infrastructure devices to modify the configuration of those devices to bring the network infrastructure configuration in-line with the segmentation policy. For example, the policy management server 110 may request or implement a change to the network infrastructure configuration to allow network traffic that is allowed by the segmentation policy but that is currently being blocked by the network infrastructure.

Figure 6:
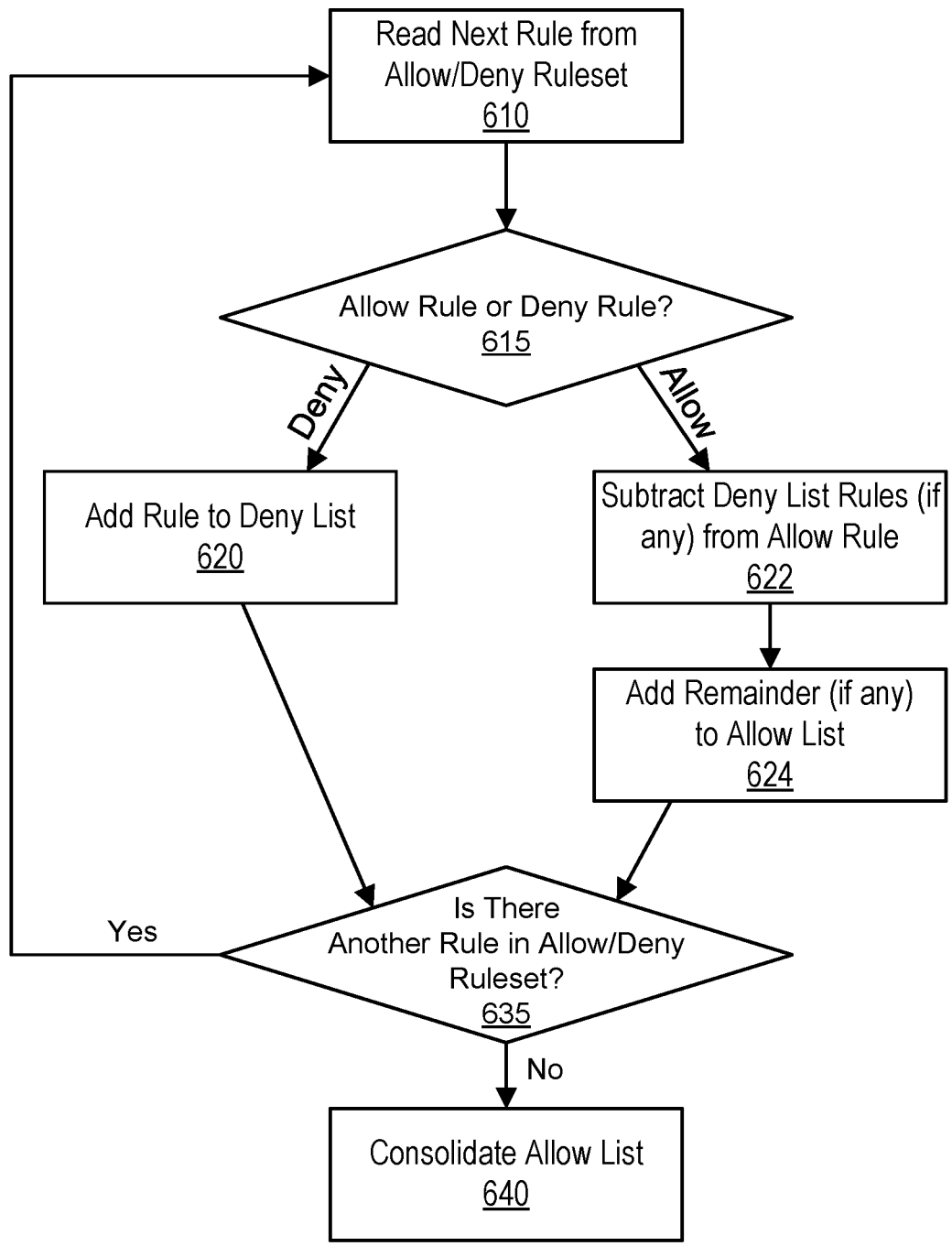
FIG. 6 is a flowchart illustrating a method for converting an allow/deny ruleset into an allow-only policy, according to one embodiment.

FIG. 6 illustrates a method for converting an allow/deny ruleset into an allow-only policy, according to one embodiment. The steps of FIG. 6 are illustrated from the perspective of the policy management server 110 performing the method. However, some or all of the steps may be performed by other entities or components. In addition, some embodiments may perform the steps in parallel, perform the steps in different orders, or perform different steps.

In the embodiment shown, the method begins with the policy management server 110 reading 610 the next rule from the allow/deny ruleset (which may be the first rule if no rules have yet been considered). The policy management server 110 determines 615 whether the rule is an allow rule or a deny rule. If the rule is a deny rule, it is added 620 to a deny list. Conversely, if the rule is an allow rule, the policy management server 110 subtracts 622 the deny list rules from the allow rule and adds 624 the remainder to an allow list.

In this context, subtracting a deny rule means converting the initial allow rule to zero or more new allow rules that cover the range of the initial allow rule less any ranges explicitly blocked by a rule on the deny list. To give a simple example, if the deny list includes a deny rule to disallow all network traffic destined for IP address 10.0.0.132 and the initial allow rule allows all network traffic addressed to the range of IP addresses 10.0.0.0/24 then the policy management server 110 will convert the combination of the initial allow rule and the deny rule into a pair of new allow rules: one allowing network traffic to addresses in the range from 10.0.0.0 to 10.0.0.131 and another allowing network traffic to addresses in the range from 10.0.0.133 to 10.0.0.255. Network traffic to address 10.0.0.132 is thus implicitly blocked because it does not have an allow rule in the allow list. In the case where the deny rules cover the entire range of the initial allow rule, the policy management server 110 may add no allow rules to the allow list. In practice, the rules may be more complicated, combining requirements for one or more of source IP, destination IP, destination port, or protocol.

After processing a rule(regardless of whether it was an allow rule or a deny rule), the policy management server 110 determines 635 whether there is another rule still to be processed in the allow/deny ruleset. If so, the net rule is read 610 and processed. If not, the policy management server wraps up the method and stores or provides the newly generated allow-only ruleset for further processing (e.g., for comparison to the segmentation policy to identify discrepancies with the configuration of the network infrastructure 170). In the embodiment shown in FIG. 6, wrapping up the method includes consolidating 640 the allow list. In this context, consolidating 640 the allow list means combining and collapsing overlapping or adjacent port or IP ranges into broader allow rules to improve the efficiency/compactness of the resulting allow-only policy. In another embodiment, the policy management server 110 does not consolidate 640 the allow list. The deny list may be discarded once the rules in the allow/deny ruleset have been processed.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The disclosed techniques may reduce instances of discrepancies between a segmentation policy and the network flows that are allowed by the underlying network infrastructure. This can have various benefits, including providing more intuitive and simpler network configuration for users, reducing the likelihood of changes to the configuration of the underlying network infrastructure exposing networked resources to security risks, and enabling administrators to match the segmentation policy to preexisting policies provided by legacy devices (e.g., system firewalls) to enable those legacy devices to be taken offline and retired. Upon reading this disclosure, those of skill in the art will appreciate additional alternative structural and functional designs for a system and process for obtaining network infrastructure feedback and addressing discrepancies between a segmentation policy and the configuration of the underlying network infrastructure. Thus, while particular embodiments and applications have been illustrated and described, it is to be understood that the described subject matter is not limited to the precise construction and components disclosed. The scope of protection should be limited only by the following claims.

What is claimed is:

1. A method for managing a segmentation policy, the method comprising:
    obtaining a segmentation policy comprising a set of rules for controlling network traffic between workloads;
    receiving infrastructure feedback regarding configuration of third-party network infrastructure, the infrastructure feedback comprising network flow data that describes network flows initiated and received by hosts, thus indicating allowable network flows in view of the configuration of the third-party network infrastructure;
    identifying, using the infrastructure feedback, a discrepancy between the segmentation policy and the configuration of the third-party network infrastructure, wherein identifying the discrepancy comprises correlating initiated and received network flows to infer a deny rule being enforced by the third-party network infrastructure for a network flow that is allowed by the segmentation policy; and
    triggering a corrective action in response to identifying the discrepancy.

2. The method of claim 1, wherein the infrastructure feedback includes an allow/deny ruleset being enforced by the third-party network infrastructure.

3. The method of claim 2, wherein identifying the discrepancy comprises:
    converting the allow/deny ruleset into an allow-only rules; and
    comparing the allow-only ruleset to the segmentation policy to identify the discrepancy.

4. The method of claim 1, wherein inferring the deny rule comprises determining that less than a threshold number of network flows initiated by a first host and destined for a second host are received by the second host.

5. The method of claim 1, wherein the network flows include packets generated by a first host and destined for a range of IP addresses and ports as part of an active probing process, the active probing process including sequentially sending a packet to each IP address and port combination in the range.

6. The method of claim 1, wherein the network flows include packets generated by a first host and destined for a range of IP addresses and ports as part of an active probing process, the active probing process including sampling the range of IP addresses and ports using a pseudo-random selection process.

7. The method of claim 1, wherein the corrective action comprises providing a notification of the discrepancy for display at an administrative client.

8. The method of claim 7, wherein the corrective action further comprises:
    causing the administrative client to display one or more controls for updating the segmentation policy;

receiving, from the administrative client, an instruction to update the segmentation policy, wherein the instruction was generated in response to user input via the one or more controls; and updating the segmentation policy in accordance with the instruction.

9. The method of claim 1, wherein the corrective action comprises automatically updating the segmentation policy to remove the discrepancy relative to the configuration of the third-party network infrastructure.

10. The method of claim 1, wherein the corrective action comprises sending a request to modify the configuration of the third-party network infrastructure to remove the discrepancy relative to the segmentation policy.

11. A non-transitory computer-readable medium including instructions for managing a segmentation policy, the instructions, when executed by a computing system, causing the computing system to perform operations comprising:

obtaining a segmentation policy comprising a set of rules for controlling network traffic between workloads;

receiving infrastructure feedback regarding configuration of third-party network infrastructure, the infrastructure feedback comprising network flow data that describes network flows initiated and received by hosts, thus indicating allowable network flows in view of the configuration of the third-party network infrastructure;

identifying, using the infrastructure feedback, a discrepancy between the segmentation policy and the configuration of the third-party network infrastructure, wherein identifying the discrepancy comprises correlating initiated and received network flows to infer a deny rule being enforced by the third-party network infrastructure for a network flow that is allowed by the segmentation policy; and triggering a corrective action in response to identifying the discrepancy.

12. The non-transitory computer-readable medium of claim 11, wherein the infrastructure feedback includes an allow/deny ruleset being enforced by the third-party network infrastructure, and wherein identifying the discrepancy comprises:

converting the allow/deny ruleset into an allow-only rules; and comparing the allow-only ruleset to the segmentation policy to identify the discrepancy.

13. The non-transitory computer-readable medium of claim 11, wherein inferring the deny rule comprises determining that less than a threshold number of network flows initiated by a first host and destined for a second host are received by the second host.

14. The non-transitory computer-readable medium of claim 11, wherein the network flows include packets generated by a first host and destined for a range of IP addresses and ports as part of an active probing process, the active probing process including sequentially sending a packet to each IP address and port combination in the range.

15. The non-transitory computer-readable medium of claim 11, wherein the network flows include packets generated by a first host and destined for a range of IP addresses and ports as part of an active probing process, the active probing process including sampling the range of IP addresses and ports using a pseudo-random selection process.

16. The non-transitory computer-readable of medium claim 11, wherein the corrective action comprises:

prodiving a notification of the discrepancy for display at an administrative client;

causing the administrative client to display one or more controls for updating the segmentation policy;

receiving, from the administrative client, an instruction to update the segmentation policy, wherein the instruction was generated in response to user input via the one or more controls; and updating the segmentation policy in accordance with the instruction.

17. The non-transitory computer-readable medium of claim 11, wherein the corrective action comprises automatically updating the segmentation policy to remove the discrepancy relative to the configuration of the third-party network infrastructure.

18. The non-transitory computer-readable medium of claim 11, wherein the corrective action comprises sending a request to modify the configuration of the third-party network infrastructure to remove the discrepancy relative to the segmentation policy.

19. A computer system comprising:

one or more processors; and a non-transitory computer-readable medium storing instructions for managing a segmentation policy, the instructions when executed by one or more processors causing the one or more processors to perform operations including:

obtaining a segmentation policy comprising a set of rules for controlling network traffic between workloads;

receiving infrastructure feedback regarding configuration of third-party network infrastructure, the infrastructure feedback comprising network flow data that describes network flows initiated and received by hosts, thus indicating allowable network flows in view of the configuration of the third-party network infrastructure;

identifying, using the infrastructure feedback, a discrepancy between the segmentation policy and the configuration of the third-party network infrastructure, wherein identifying the discrepancy comprises correlating initiated and received network flows to infer a deny rule being enforced by the third-party network infrastructure for a network flow that is allowed by the segmentation policy; and triggering a corrective action in response to identifying the discrepancy.

20. The computer system of claim 19, wherein inferring the deny rule comprises determining that less than a threshold number of network flows initiated by a first host and destined for a second host are received by the second host.

* * * * *